(12) United States Patent
Babaian et al.

(10) Patent No.: US 7,069,412 B2
(45) Date of Patent: Jun. 27, 2006

(54) METHOD OF USING A PLURALITY OF VIRTUAL MEMORY SPACES FOR PROVIDING EFFICIENT BINARY COMPATIBILITY BETWEEN A PLURALITY OF SOURCE ARCHITECTURES AND A SINGLE TARGET ARCHITECTURE

(75) Inventors: Boris A. Babaian, Moscow (RU); Roman A. Khvatov, Moscow (RU); Alexander V. Ermolovich, Moscow (RU)

(73) Assignee: Elbrus International, Grand Cayman ( * ) Notice: Subject to any disclaimer, the term of this patent is extended or adjusted under 35 U.S.C. 154(b) by 210 days.

(21) Appl. No.: 10/453,448

(22) Filed: Jun. 2, 2003

(65) Prior Publication Data
US 2004/0024953 A1 Feb. 5, 2004

Related U.S. Application Data

(63) Continuation-in-part of application No. 09/506,672, filed on Feb. 17, 2000, now abandoned.

(60) Provisional application No. 60/120,344, filed on Feb. 17, 1999.

(51) Int. Cl.
*G06F 12/10* (2006.01)

(52) U.S. Cl. .................... 711/203; 711/6; 711/206; 711/209

(58) Field of Classification Search ............ 711/5, 711/6, 202–210
See application file for complete search history.

(56) References Cited

U.S. PATENT DOCUMENTS 5,404,478 A * 4/1995 Arai et al. ................. 711/206

5,560,013 A 9/1996 Scalzi et al.
(Continued)

OTHER PUBLICATIONS

Diefendorff, Keith: "The Russians are coming"; Microprocessor Report, vol. 13, No. 2; pp. 1-7; Feb. 15, 1999.
(Continued)

*Primary Examiner*—Matthew D. Anderson
*Assistant Examiner*—Hetul Patel
(74) *Attorney, Agent, or Firm*—Townsend & Townsend & Crew LLP (57) ABSTRACT

A plurality of virtual memory spaces is implemented in a computer system designed to be binary-compatible with one or a plurality of foreign architectures. A single primary virtual memory space, designated as the native VM space, contains native codes directly executable by the host microprocessor, such as the binary translated codes and the binary translation process/system itself. One or a plurality of secondary virtual memory spaces, designated as the foreign VM space(s), contain foreign data and codes (to be translated into binary translated codes in the primary VM space) only, hence encompassing no native code executable by the host microprocessor directly. In one embodiment, each foreign architecture supported by the host microprocessor through the binary translation process is provided its own secondary VM space; hence the number of the secondary VM spaces supported equals the number of the foreign architectures supported. While all VM spaces are directly supported by the host microprocessor MMU hardware including, for example, corresponding address translation schemes and exception delivery, their properties may differ significantly, allowing for the primary VM to exploit the host microprocessor architecture benefits to the fullest possible extent at the same time as the secondary VM spaces mimic VM spaces of the corresponding foreign microprocessor architectures. After corresponding address translation, addresses from both the primary and the secondary VM space(s) are mapped to a single physical address space of the host microprocessor.

3 Claims, 4 Drawing Sheets

U.S. PATENT DOCUMENTS

| | | |
|---|---|---|
| 5,627,987 A | 5/1997 | Nozue et al. |
| 5,781,750 A | 7/1998 | Blomgren et al. |
| 5,875,336 A * | 2/1999 | Dickol et al. ............... 717/143 |
| 5,893,931 A | 4/1999 | Peng et al. |
| 5,958,061 A | 9/1999 | Kelly et al. |
| 6,212,614 B1 | 4/2001 | Hoerig et al. |
| 6,223,256 B1 | 4/2001 | Gaither |
| 6,751,583 B1 * | 6/2004 | Clarke et al. ................ 703/17 |

OTHER PUBLICATIONS

Ebcioglu et al.: "DAISY: Dynamic compilation for 100% architectural Compatibility"; Computer Architecture News, vol. 25, No. 2; pp. 26-37; May 1997.

Hesseldahl, Arik: "The Rusians are coming?".

Silberman, Gabriel M. and Kemal Ebcioglu: "An architectural framework for supporting heterogenous instruction-set architectures"; IEEE; pp. 39-56 (Jun. 1993).

Sites, Richard L. et al.: "Binary translation"; Communications of the ACM, vol. 36, No. 2; pp. 69-81; Feb. 1993.

* cited by examiner

METHOD OF USING A PLURALITY OF VIRTUAL MEMORY SPACES FOR PROVIDING EFFICIENT BINARY COMPATIBILITY BETWEEN A PLURALITY OF SOURCE ARCHITECTURES AND A SINGLE TARGET ARCHITECTURE

CROSS-REFERENCES TO RELATED APPLICATIONS

This application is a continuation-in-part application of U.S. application Ser. No. 09/506,672, filed Feb. 17, 2000 now abandoned, which is a non-provisional of U.S. Provisional Patent Application Serial No. 60/120,344, filed Feb. 17, 1999, entitled "USING TWO VIRTUAL MEMORY SPACES FOR EFFECTIVENESS AND RELIABLE BINARY TRANSLATION BETWEEN DIFFERENT INSTRUCTION SETS," the disclosure of each of which is hereby incorporated by reference in its entirety. This application is also related to the following co-pending U.S. Patent Applications, the disclosures of which are each hereby incorporated by reference in its entirety: patent application Ser. No. 09/505,652, entitled "SYSTEM FOR IMPROVING TRANSLATION OF SOFTWARE FROM A NATIVE COMPUTER PLATFORM TO A TARGET COMPUTER PLATFORM", filed Feb. 17, 2000; patent application Ser. No. 09/506,411, entitled "METHOD AND APPARATUS FOR EXECUTION OF MULTIPLE INSTRUCTION SETS ON THE HOST ARCHITECTURE THROUGH OPTIMIZING BINARY TRANSLATION", filed Feb. 17, 2000; and patent application Ser. No. 09/505,654, entitled "METHOD AND APPARATUS FOR CALL/RETURN PAIR SUPPORT WHILE EXECUTING ANOTHER INSTRUCTION SET ON THE HOST PLATFORM", filed Feb. 17, 2000.

BACKGROUND OF THE INVENTION

1. Field of the Invention

The present invention relates to computer systems and, more specifically, to systems and methods for providing hardware support for efficient binary translation in computer systems and microprocessors.

2. History of the Prior Art

As more and more new computer system installations become available around the world annually, the problem of providing binary compatibility with the existing software generations in future microprocessor designs becomes even more aggravated. It does not matter how advanced the design of a new microprocessor will be, if the release of the new computer system is not backed by the availability of the software packages expected by customers, such a computer system will end up with a little or no attention at all from the public.

A self-evident solution to this problem is to design a new microprocessor that is able to execute a code built for models available in the market at the hardware level. This solution would not only decrease the efficiency of the new microprocessor and require additional hardware, but it could ruin potential benefits achievable by the new microprocessor design.

Another solution to this problem is based on a complex, resource-and time-consuming process of negotiating with software developers and publishers to support the architecture being developed and provide new, compatible versions of their products. Such a solution would likely result in a lengthy schedule due to possible complex product adaptations, and it would also be error-prone since the already well-tested versions of the software applications would get replaced by the new adaptations without the equivalent degree of coverage testing. Moreover, some of the available products would be left unported, making members of the public unhappy that their new computer system is unable to perform tasks completed easily by their old system.

Yet another solution to the problem of binary compatibility is to provide a binary translation technique that allows one to design a highly advanced microprocessor while preserving the ability for high-performance execution of the code compiled for other earlier-developed wide-spread microprocessor architectures.

Binary translation is a process of converting an instruction stream having instructions for the source microprocessor architecture into an instruction stream composed of instructions for the target microprocessor architecture. The source and the target microprocessor architectures could differ substantially. Using a dynamic binary translation process, which is designed to discover new source code sequences and translate them to semantically equivalent target code sequences at run-time, it becomes possible to design a microprocessor of some new architecture that is still able to execute a complete variety of available software products designed for a different (hence foreign) architecture microprocessor. Not only could foreign applications be translated, but foreign operating systems (OSs) as well could be passed through the binary translation process resulting in complete emulation of the foreign computer system functionality by the new computer system design. The resulting computer system could be bundled with the binary translation system written in the native codes as a part of its firmware. It could be advertised as being able to execute both native applications (if they are planned to be developed for this particular computer system) and a complete set of readily available foreign applications and OSs, providing users with an immediate useful experience.

One of the problems arising during the design of such a binary-translation-based computer system lies in memory management. Emulation of the foreign computer system to the fullest extent possible requires maintaining a foreign-code-perceivable virtual memory (VM) space that is identical to the virtual memory space resulting from execution of the same code on real foreign hardware. Such memory management can be problematic. First, because the memory management unit (MMU) for the new microprocessor design can differ considerably in terms of its organization and functionality (i.e., due to many enhancements implemented to improve native code execution performance) from the MMU of a foreign microprocessor, this might require either giving up all the advancements planned for the native MMU or placing an additional burden of the software (or software-assisted) foreign virtual memory management on the binary translated system, which could reduce the binary translated code execution performance considerably. Moreover, since the existence of the binary-translated-code and the binary translation system itself should not be perceived by the foreign codes being executed, some methods of filtering memory access operations initiated by binary-translated-code need to be provided, resulting in a run-time software-controlled memory access process or other inflexible and cumbersome solutions like a physical memory split. Additionally, the binary translated codes could not only initiate memory access transactions on behalf of the original translated foreign codes, but will also need some means of communication with the run-time support section of the binary translation system, thereby requiring some mechanism to override the filter rules applied or some sort of a gateway to be implemented, possibly reducing the integral performance even more.

If a possibility for running native applications is considered as well, additional difficulties may arise, since simplifying the native MMU design to mimic the foreign MMU design could result in a noticeable performance loss. Also, the possibility of simultaneous execution of the native and foreign applications may significantly escalate existing concerns about memory protection (including protection of the foreign code and data from a possibly buggy native application) and dual OS (native and foreign) cooperation techniques.

Not only do such problems interfere with efficient implementation of current binary translation-based computer system designs, which are usually developed to provide binary compatibility with a single foreign architecture, but they also inhibit the development of more advanced solutions providing binary compatibility with multiple foreign architectures. Each new supported foreign architecture requires another dimension added to the virtual memory emulation layer of the binary translation system, resulting in implementation of another translation scheme, other memory access filtering rules and other memory content protection measures, all increasing the complexity and reducing performance of the resulting computer system.

It is therefore desirable to provide systems and methods that overcome these obstacles and provide developers with more power to create a computer system that can execute applications from a multitude of distinct foreign computer architectures, allowing such a computer system to achieve compatibility levels unattainable before. Such a single system could not only be viewed as a natural upgrade path by all users utilizing the different supported foreign computer systems, but it would also provide a unique experience of its own, for example giving users the opportunity to run best-of-breed applications available for different foreign architectures simultaneously on a single computer system.

BRIEF SUMMARY OF THE INVENTION

The present invention provides memory management systems and methods that overcome the aforementioned problems, thereby facilitating the development of future computer systems making extensive use of the binary translation techniques. Not only are the reliability and effectiveness of binary translation enhanced by the present invention, but a natural way of coexistence between native and multiple foreign applications (each of which could be compiled for a distinct computer architecture) in the same computer system is provided as well.

According to the present invention, a plurality of virtual memory spaces is implemented in a computer system designed to be binary-compatible with one of a plurality of foreign architectures. A single primary virtual memory space, designated as the native VM space, contains native codes directly executable by the host microprocessor, such as the binary translated codes and the binary translation process/system itself. One or a plurality of secondary virtual memory spaces, designated as the foreign VM space(s), each contain foreign data and codes (to be translated into binary translated codes in the primary VM space) only, hence encompassing no native code executable by the host microprocessor directly. In one embodiment, each foreign architecture supported by the host microprocessor through the binary translation technique is provided its own secondary VM space; hence the number of the secondary VM spaces supported equals the number of the foreign architectures supported. While all VM spaces are directly supported by the host microprocessor MMU hardware including, for example, corresponding address translation schemes and exception delivery, their properties may differ significantly, allowing for the primary VM to exploit the host microprocessor architecture benefits to the fullest possible extent at the same time as the secondary VM spaces mimic VM spaces of the corresponding foreign microprocessor architectures. After corresponding address translation, addresses from both the primary and the secondary VM space(s) are mapped to a single physical address space of the host microprocessor.

To exploit this extended functionality, the microprocessor architecture of the present invention provides multiple sets of memory access operations, for example, a single set of primary space access operations and one or a plurality of secondary space access operation sets corresponding to each supported foreign VM space. The primary space access operation set accesses the primary VM space only, and each of the secondary space access operation sets accesses a corresponding secondary VM space only. In certain aspects, a single native process, such as a binary translation system or a binary translated code, contains memory access operations from any of the sets in a mixed fashion, allowing native code to access any of the VM spaces provided.

According to one aspect, during binary translation, foreign code sequences fetched from a secondary VM space are translated into semantically equivalent native code sequences (binary translated codes), wherein the original foreign memory access operations are replaced by semantically equivalent constructs utilizing the secondary space access operations for the secondary VM space from which the foreign code sequences were fetched. Binary translated codes as well as the binary translation system itself are placed in the primary VM space, hence being inaccessible by all the binary translated (from the foreign code) secondary space access operations. This provides to the foreign codes being executed by means of the binary translation a perceivable (secondary) VM state substantially identical to the state achieved when running the foreign codes natively on the foreign hardware.

Because separation of the VM spaces is achieved in hardware, no additional software load is required to limit or otherwise filter memory access operations in the binary translated code, thereby improving the effectiveness of the binary translation process without sacrificing reliability. And because the native OS and applications utilize the primary space operations only, they need not know about the secondary VM spaces' properties or their existence at all. Thus, the present invention forms a natural foundation for foreign and native applications to coexist in the same computer system without disturbing each other. Thus, in certain aspects, the present invention allows for a single computer system to operate as a native-only, foreign-only or a mixed-mode computer system on demand.

According to one aspect of the present invention, a memory system associated with a host microprocessor is provided. The memory system typically includes a plurality of virtual memory spaces, each based on a distinct virtual address translation scheme and defined by a distinct page table structure. The memory system also typically includes a single physical memory space, and a plurality of hardware mechanisms, each associated with one of the virtual memory spaces, configured to translate a virtual address in the associated virtual memory space into a physical address for the physical memory space in accordance with the virtual address translation scheme for the associated virtual memory space.

According to another aspect of the present invention, a host microprocessor capable of executing a native instruction set and a plurality of foreign instruction sets is provided. The host microprocessor typically includes a memory system and means for simulating execution of instructions from multiple foreign instruction sets. The memory system of the host microprocessor typically includes a plurality of virtual memory spaces, each based on a distinct virtual address translation scheme and defined by a distinct page table structure. the memory system of the host microprocessor also typically includes a single physical memory space, and a plurality of hardware mechanisms, each associated with one of the virtual memory spaces, each configured to translate a virtual address in the associated virtual memory space into a physical address for the physical memory space in accordance with the virtual address translation scheme for the associated virtual memory space. The memory system also typically includes a plurality of memory access operations sets, wherein the number of the memory access operations sets equals the number of the virtual spaces.

According to yet another aspect of the present invention, a method is provided for creating a plurality of virtual memory spaces for a host application using a plurality of hardware access mechanisms, the method being implemented in a host microprocessor having a single physical memory space. The method typically includes creating a plurality of virtual memory spaces, each based on a distinct virtual address translation scheme and defined by a distinct page table structure, wherein each of the plurality of hardware mechanisms is associated with one of the virtual memory spaces, and wherein each hardware mechanism translates a virtual address in the associated virtual memory space into a physical address for the physical memory space in accordance with the virtual address translation scheme for the associated virtual memory space. The method also typically includes creating a plurality of memory access operations sets, wherein the number of the memory access operations sets equals the number of the virtual spaces.

According to a further aspect of the present invention, a computer system is provided that typically includes a host microprocessor, a memory system associated with the host microprocessor, and a binary translation software module configured to simulate execution of instructions from multiple foreign instruction sets. The memory system typically includes a single physical memory space and a plurality of virtual memory spaces, each based on a distinct virtual address translation scheme and defined by a distinct page table structure. The memory system also typically includes a plurality of hardware mechanisms, each associated with one of the virtual memory spaces, each configured to translate a virtual address in the associated virtual memory space into a physical address for the physical memory space in accordance with the virtual address translation scheme for the associated virtual memory space, and a plurality of memory access operations sets, wherein the number of the memory access operations sets equals the number of the virtual spaces.

According to still a further aspect of the present invention, a computer system is provided that typically includes a host microprocessor, a memory system associated with the host microprocessor, and a binary translation software module configured to simulate execution of instructions from multiple foreign instruction sets. The memory system typically includes a single physical memory space, means for creating multiple different virtual memory spaces for a host application, and means for accessing multiple virtual memory spaces by a host application during its execution by using separate sets of host memory access operations provided for each of the supported virtual memory spaces.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

BRIEF DESCRIPTION OF THE DRAWINGS

FIGS. 2(a) and (b) depict the memory access patterns used during code execution according to one embodiment of the present invention.

DETAILED DESCRIPTION OF THE INVENTION

To facilitate a clear and concise description, specific embodiments of the present invention are discussed in what follows. For the sake of simplicity, however, these specific embodiments include support for only a single foreign virtual memory (VM) space, hence limiting binary compatibility of the computer system being discussed to a single foreign architecture. However, it should be understood that the present invention is also applicable to supporting a plurality of foreign VM spaces, and hence compatibility with a plurality of foreign architectures, by applying a similar description to each foreign VM space supported in the computer system built in accordance with the present invention.

Figure 1:
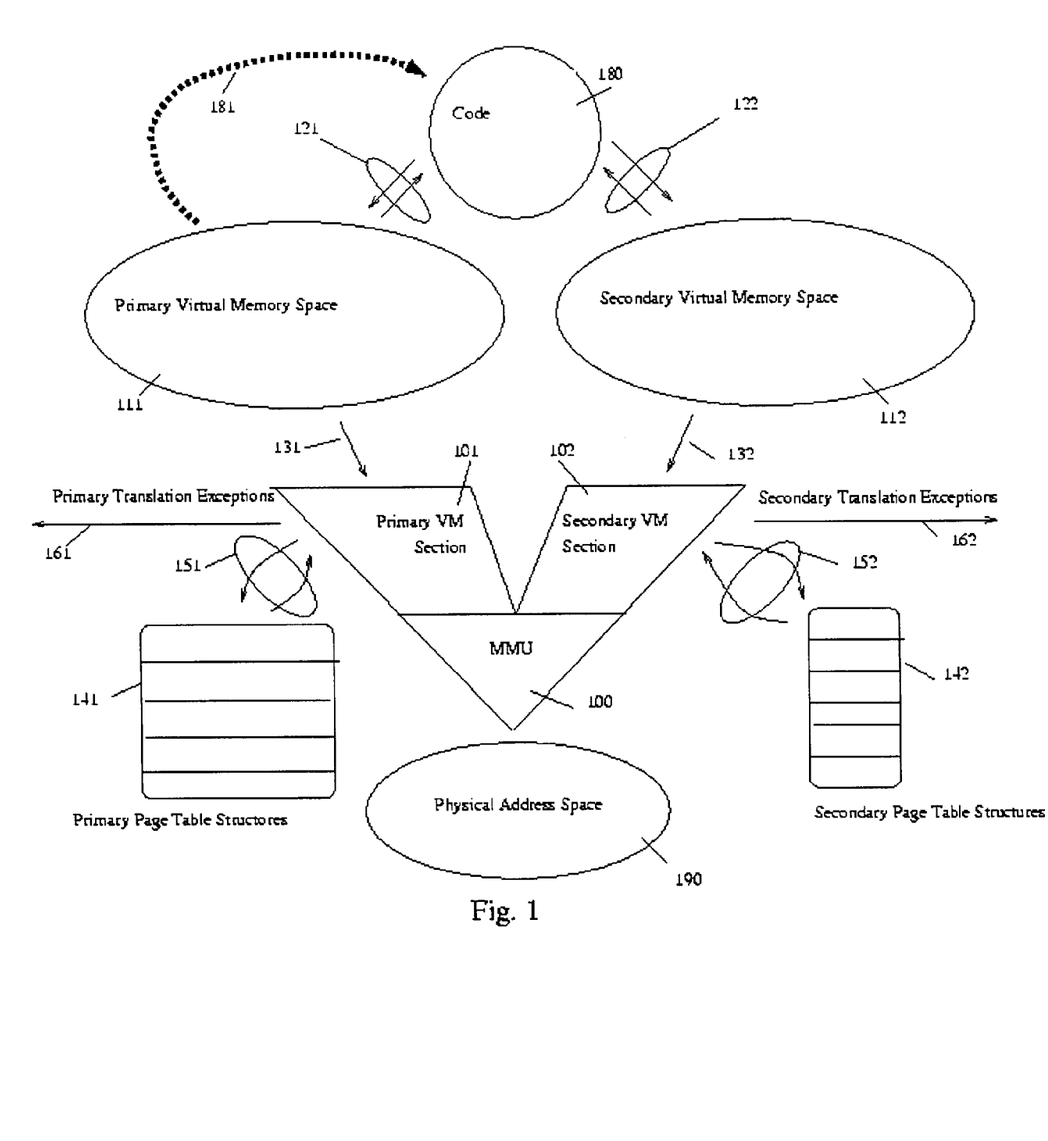
FIG. 1 illustrates an example of an MMU built in accordance with one embodiment of the present invention.

FIG. 1 illustrates an example of aspects of a memory system including an MMU for a microprocessor constructed in accordance with one embodiment of the present invention. As shown in FIG. 1, a pair of distinctive virtual memory spaces is made available to the system, namely the primary VM space (111) and the secondary VM space (112). These two spaces are completely unrelated to each other, allowing them to bear different and unique properties; for example, the primary space could provide for 64-bit wide virtual addresses while the secondary space could be limited to 32-bit addresses.

In one embodiment, the microprocessor-hardware-executed code (180) is made aware of this feature by means of providing two completely independent memory access operation sets in the microprocessor's architecture description—primary space access operations (121) and secondary space access operations (122). Primary space access operations (121) are defined to access only primary VM space (111), and the secondary space access operations (122) are defined to access only secondary VM space (112). For multiple secondary VM spaces (112), multiple corresponding secondary space access operation sets (122) are provided.

While fetching the code to be executed from memory, the microprocessor hardware utilizes only primary VM space access operations (181), allowing for the executable code to be located in the primary VM space (111) only. The executed code (180) could contain any mix of the primary (121) and secondary (122) access operations, each of them being targeted to a respective VM space (111,112).

According to one embodiment of the present invention, the MMU includes a primary VM management section (101), a secondary VM management section (102) and a common parts section (100). In certain aspects, common parts section (100) includes hardware mechanisms that may be shared by both native and foreign MMU sections. For example, in one aspect, common parts section (100) is provided to allow a designer to share some apparatus between both sections of an MMU, such as, e.g., a single translation lookaside buffer (TLB) space to cache translations from both foreign and native MMU sections.

Primary space accesses (131) pass through the primary VM section (101), which is configured to perform primary space address translation and related operations in accordance with the translation scheme chosen for the primary VM space. For example, VM section (101) accesses (151) primary page table structures (141) and produces a specific set of primary translation exceptions (161).

Secondary space accesses (132) pass through the secondary VM management section (102), which is configured to perform secondary space address translation and related operations in accordance with the translation scheme chosen for the secondary VM space. Again, since both VM spaces are considered independent, the translation scheme used for the secondary space addresses does not need to relate in any way to the translation scheme used for the primary space addresses. Accordingly, the format of the secondary page table structures (142) is considered independent of the format of the primary page table structures (141); the nature of the page table access operations (152, 151) are independent as well. The secondary translation exceptions (162) are considered independent of the primary translation exceptions (161) and could encompass a completely different set of conditions; both sets of exceptions (161,162) are clearly identified when delivered into the microprocessor.

Memory access operations (131,132) from both VM spaces, processed by the MMU in the absence of the exceptions, will eventually reach the single physical address space (190).

Figure 2:
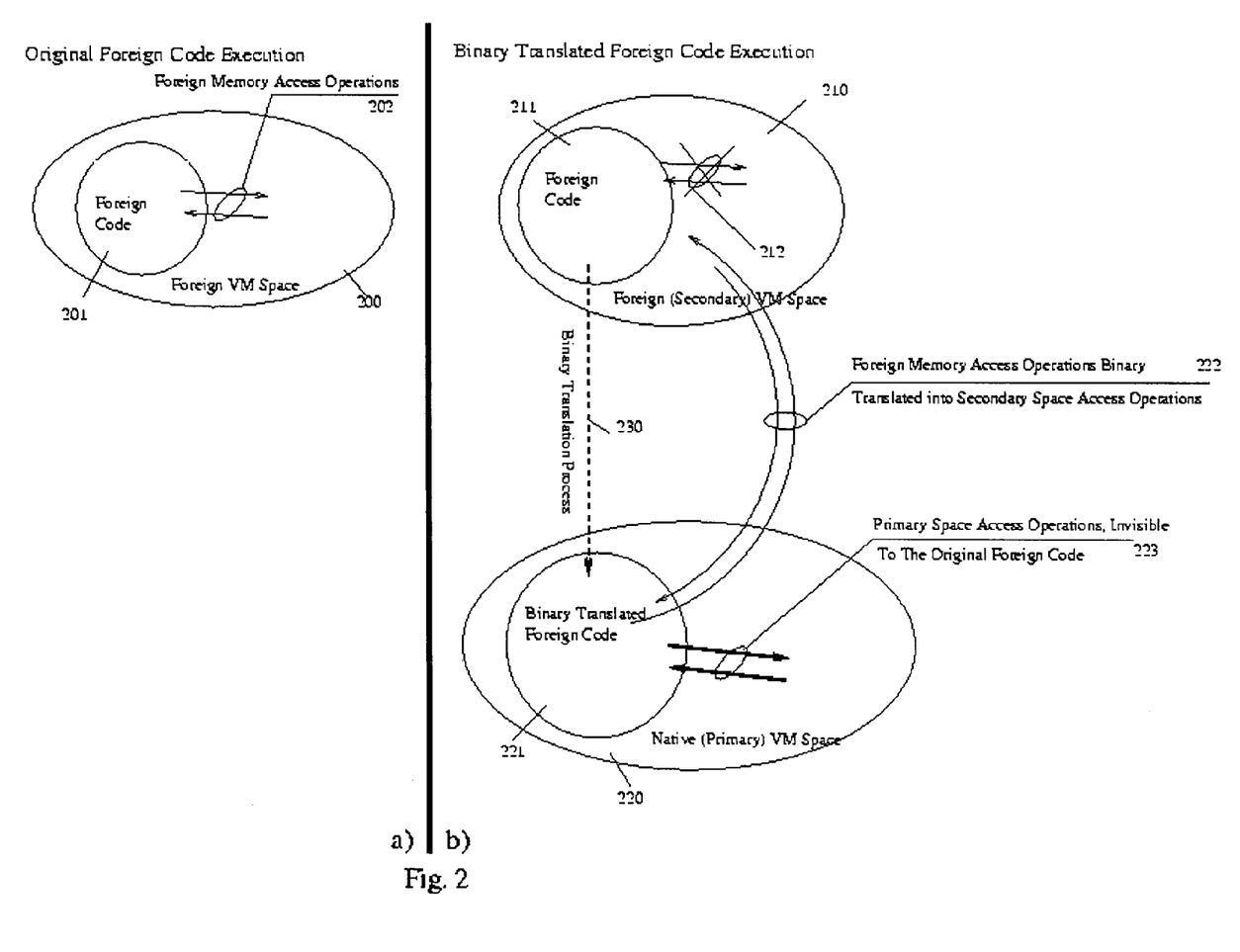

Further describing the present invention, FIGS. 2(*a*) and (*b*) depict the memory access patterns used during the code execution according to one embodiment. FIG. 2(*a*) depicts a typical execution of the foreign code (201) by foreign hardware, which is able to execute the application natively. Foreign hardware provides for the foreign VM space (200) including some foreign address translation scheme and corresponding translation exceptions, which would be delivered to the foreign OS executed by the foreign hardware. The executed code contains foreign memory access operations (202), targeted to the foreign VM space (200) and processed by the foreign microprocessor MMU accordingly.

Note that the term 'foreign' is generally used to describe objects, which are of a foreign nature to the host microprocessor constructed in accordance with the present invention. From the foreign computer system's point of view, all the objects described are inherently native to it.

FIG. 2(*b*) shows the behavior of a new microprocessor design constructed and utilized according to an embodiment of the present invention. While the new microprocessor is unable to execute a foreign code by using hardware, it relies on binary translation for achieving the foreign code execution capability. The binary translation process 230 decodes foreign code instruction sequences, translates them to the semantically equivalent native code sequences and stores the semantically equivalent native code sequences in a special translation buffer to ensure possible speed-up during later re-execution of the same foreign code sequences. As the microprocessor is specifically designed in accordance with the present invention to assist binary translation, it is equipped with the primary (220) and the secondary (210) VM spaces.

Primary VM space (220) is designed to exploit benefits of the new microprocessor architecture to the maximum extent and is intended to store and execute codes that are native to the new microprocessor. On the other hand, the secondary VM space (210) is designed to mimic the foreign architecture VM space (200), including, for example, the address space properties, address translation scheme, page table structures and translation exceptions set. During operation of the microprocessor, the foreign (not executable by the new microprocessor hardware) codes and data are stored in the secondary (hence foreign) VM space 210, while the native code and data, such as the binary translation system and resulting translations, are stored in the primary (hence native) VM space 220, which is the only VM space allowed to contain codes executable by the new microprocessor.

Binary translation process (230) translates the foreign code sequences to be executed (211) from the secondary VM space (210) into the native code sequences (221) and places them into the primary VM space (220), from where their instructions can be directly fetched and executed by the microprocessor. Any memory access operations found in the foreign code (212) are replaced by the semantically equivalent secondary space access operations (222) inside the binary translated code sequences (221). Since the secondary VM space (210) mimics the original foreign VM space (200) in detail, the effects of execution of these secondary space access operations (222) will mimic the original foreign memory space access operations (202) effects in detail, including similar address translation schemes and possible translation exceptions, thus providing complete consistency in the foreign code perceivable VM space state between the microprocessor executing the binary translated version of the foreign code and the same code run by the foreign hardware natively. Binary translated code sequences (221) might also contain primary VM space accesses (223) stemming from their binary translated nature instead of memory access operations in the foreign code (212). These memory accesses, as well as existence of the whole primary VM space 220 (including the binary translation system and the translations itself) stay concealed from the foreign code executed by means of the binary translation by the microprocessor due to complete VM space separation.

Figure 3:
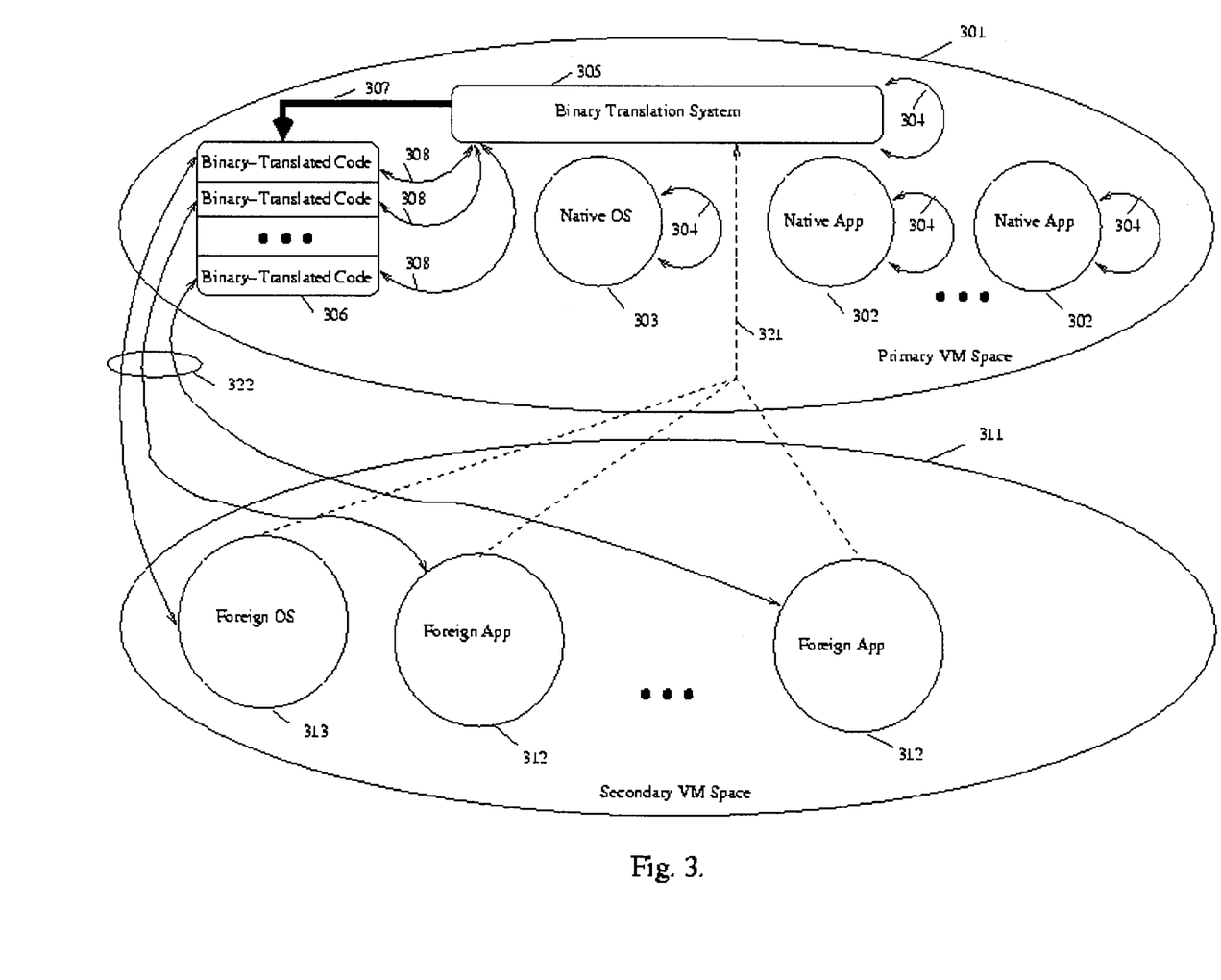
FIG. 3 illustrates aspects of a computer system configured to execute native as well as foreign applications simultaneously and efficiently according to one embodiment of the present invention

FIG. 3 illustrates aspects of a computer system configured to execute native as well as foreign applications simultaneously and efficiently according to one embodiment of the present invention.

Native applications (302) and OS (303) are compiled for the target architecture and presented to the host microprocessor without any additional preprocessing. Because these applications are compiled specifically for the target architecture, their memory accesses are encompassed by the primary VM space (301), and accordingly all memory access operations generated in their code are primary address space access operations (304). These memory accesses pass through the primary VM MMU section (101) (FIG. 1) and are subject to all advanced properties of the primary VM unique to the target architecture, for example, possibly including large page sizes, vast address space and specific protection schemes.

Any possible translation faults encountered by these memory access operations will be clearly identified as primary translation exceptions (161), and being delivered to the native OS (303) are processed by the native OS accordingly. Since no secondary space access operations are embedded in the native application code, the existence of the secondary VM space (311) stays unnoticed by the native applications, effectively making all foreign applications (312) invisible for the native applications.

Foreign applications (312) and OS (313) are compiled for the foreign architecture and can not be executed directly by the host microprocessor. Instead, in one embodiment, a binary translation process module (305) is used to translate foreign code sequences into functionally equivalent sequences of the target architecture code, as required by the control flow of the foreign code, and store the translated sequence into a unified translation pool (306). Additionally, a translation log is updated to account for the current foreign code sequence already translated and stored into the translation pool, allowing later executions of the same foreign code sequence to skip the translation stage and execute the translated sequence(s) directly.

At the translation stage, the binary translation process (305) uses primary space access operations (304, 307) for its own data accesses, and secondary space access operations (321) to fetch foreign code sequences from a foreign code in secondary VM space (311). When binary translation process (305) encounters a memory access operation in the foreign code being translated, secondary space access operations (322) are generated in the translated code, which is placed in the translation pool (306) via primary space access operations (307). Besides these memory access operations (322), the binary translated code could also include some primary space access operations (308), which have no equivalent memory access operations in the original foreign code. These primary space access operations are used in run-time to interface code translations with the binary translation system itself and are invisible to the foreign code being executed.

Accordingly, these secondary memory accesses 321 during code fetch, and data manipulations during binary translated code execution (322), pass through the secondary VM MMU section (102) constructed to mimic the foreign architecture MMU behavior and are subjected to all properties of the secondary VM, unique to the foreign architecture and completely unrelated to the primary VM properties. Additionally, in certain aspects, some specific properties, such as additional memory protection facilities intended to prevent the already translated foreign code sequence modifications from being unnoticed by the binary translation system, which could result in obsolete binary translated code residing in the translation pool, are implemented in this MMU section 102 to improve binary translation system performance.

Any possible translation faults encountered by the secondary memory access operations are clearly identified as secondary translation exceptions (162) and, being delivered to the native OS (303), are redirected to the binary translation system (305), which distinguishes between the aforementioned special functionality-related exceptions, which are internal to the binary translation system, and ordinary foreign translation exceptions.

Since the secondary VM MMU 102 mimics foreign MMU structure, it operates with the unmodified foreign-format page table hierarchy and generates exceptions similar to a foreign exception set, which allows binary translation system (305) to pass secondary VM space (311) management to the foreign OS (313) almost completely. Accordingly, ordinary foreign translation exceptions are simply delivered further to the foreign OS (313), just as it would be in the case of direct execution of the foreign OS on a foreign host. The equivalents of the foreign host exceptions resulting from code fetch by the CPU are generated on secondary space accesses performed by the binary translation system 305 during the foreign code fetch (similar actions are also programmed inside any binary translated code sequence to support further execution passes), and the equivalents to the foreign host exceptions resulting from foreign memory access operations in foreign code are generated on the secondary space access operations in the binary translated version of the foreign code, arranged in the semantically equivalent fashion.

Because, in certain aspects, memory access operations originating from the foreign code are translated to the secondary space access operations (322), the present invention effectively renders the whole primary VM space (301) invisible to the foreign codes in their semantically-equivalent binary translated form (306), making foreign OS (313) and applications (312) completely unaware about binary translation system (305), native OS (303), applications (302) and target host MMU architecture in general.

The computer system architecture of the present invention allows for both native and foreign codes to be executed simultaneously and efficiently. Because the presence or absence of the secondary VM space is completely concealed from the native applications, native application developers and OS architects need not care about any possible interference between native and binary applications, since no such interference could occur. Native applications for the platform described can be designed similar to any other ordinary applications for the platforms lacking foreign code execution capability. Since decoupling of the primary and secondary VM MMU sections allows them to be of a completely different design, it allows for the enhancement of the primary VM translation section with any new features that are unavailable in the secondary VM translation scheme, such as more strict protection mechanisms, vast virtual memory space and different page sizes; all the benefits readily available to the native applications. Advantageously, the binary translation system no longer needs to care about hiding itself (and other native applications) from the executed foreign code, since it resides in a primary VM space completely inaccessible to the foreign codes. Besides, as the secondary address space remains an identical replica of the foreign address space of the same workload being executed on a foreign host machine, it becomes possible to utilize foreign OS VM management facilities without any alterations to account for disturbances injected by the binary translation system, which shares the same address space. Combined with support of a foreign VM translation mechanism in hardware, this frees up binary translation system resources which would otherwise be wasted for the foreign VM management, allowing those resources to be devoted to a higher level of the performed optimizations or to simply run binary translated foreign code faster.

In effect, such a computer system architecture could be utilized in a plurality of different scenarios without any additional modifications required except for the choice of an appropriate software package. Depending on the workload planned, the same computer system architecture could be readily accessed as, for example:

\*) A foreign-only execution environment. If there is no need to run native applications or the available quantity of these applications is insufficient, the computer system could be utilized to execute foreign applications alone. Native OS functions are merged with the binary translation system, and the latter stays firmly isolated from the foreign VM space.

\*) A mixed mode computer system, running under the control of a native OS. The possibility to execute both legacy foreign code and contemporary high-performance native applications and OS results in ultimate performance in mission-critical tasks (native code) without compromising the compatibility with the already familiar and widespread applications (foreign code). Since both worlds of the native and the foreign applications exist completely unaware of each other, some method for preventing resource contention for peripheral devices should be implemented, be it physically distinctive peripheral device sets or virtual hardware implementation for the foreign OS being executed. By the nature of the isolation achieved, no special requirements to the foreign OS being used are applicable.

\*) A mixed mode computer system, running under the control of a foreign OS. Enhancing the binary translation system with some of the functions of the native OS and designing special interface drivers for the foreign OS allows for resolving the resource contention problem by allowing the foreign OS to manage available peripheral devices and rely on the binary translation system working in collaboration with the foreign OS driver provided to perform native applications management. Because an interface driver should be provided (to facilitate peripheral devices access, etc) for the foreign OS being executed, this method limits a possible set of foreign OSs to the supported ones. Note that native applications need not care about being controlled by the native or by the foreign OS, since they are still isolated from the foreign codes at run-time in the primary VM space and are still using the same system call conventions (only being interpreted by the binary translation system in this case).

\*) A native-only execution environment. Using this mode of operation dismisses the secondary VM space and the binary translation system itself, if there is no need to execute a foreign application.

Accordingly, such a computer system architecture based on the present invention readily provides all flexibility required in the market today due to the highly dynamic nature of the contemporary IT world. For example, the present invention allows for starting with a foreign-only execution environment, gradually advancing to the mixed mode environment as more and more native applications become available and finally jumping to a native-only environment, still preserving the possibility to fall-back to the mixed mode in case some useful application(s) are found to exist in a foreign code form only.

Figure 4:
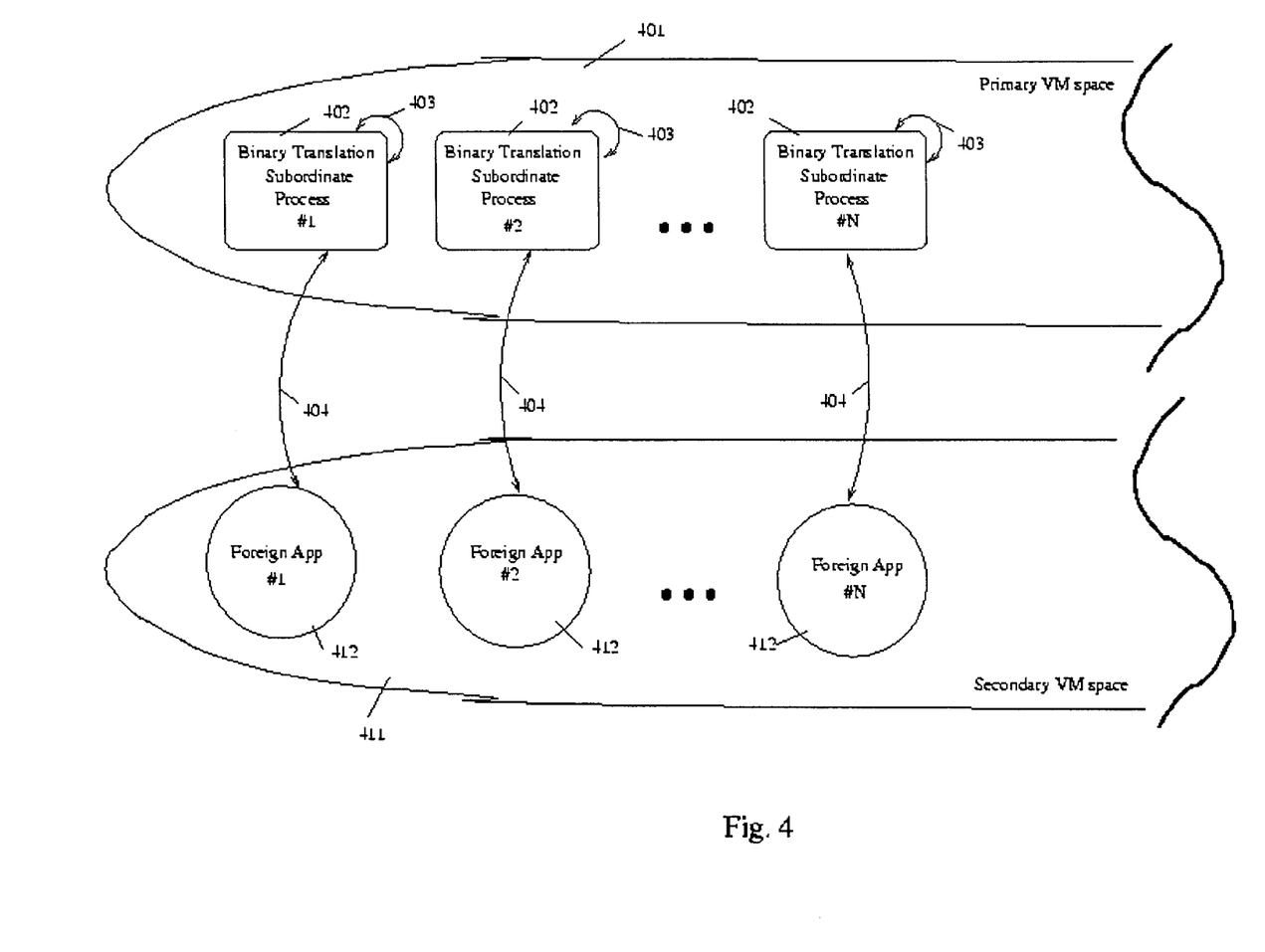
FIG. 4 illustrates an enhancement applied to the computer system architecture of FIG. 3 according to another embodiment of the present invention.

FIG. 4 illustrates an enhancement applied to the computer system architecture of FIG. 3 according to another embodiment of the present invention.

While modern binary translation systems are expected to be satisfied with the computer system design depicted in FIG. 3, it is acknowledged that future binary translation systems designed to perform more aggressive code optimizations could require a tighter dependence on the exact context of the foreign application (code) being translated, including switching code analysis and translation techniques while switching between different foreign applications.

Because the present invention empowers not a single but a plurality of native processes with the ability to access the secondary VM space (411) as well as the primary (401) VM space, it is desirable to provide a plurality of the subordinate binary translation system processes (402), each of which could be associated with a single foreign process (412). In this case, a 1:1 correspondence scheme is achieved via a parallel VM context switching technique, where the VM context switch in the secondary VM space (411) (initiated by the binary-translated foreign OS during the foreign task switching sequence) is detected and mirrored as a primary VM space (401) context switch (initiated by the binary translation system to switch its subordinate processes accordingly (with some help from the native OS, in some cases)). In this manner, each of the subordinate binary translation system processes (402) could easily provide distinct analysis and code translation functionality for the foreign process (412) associated therewith, without resorting to utilizing complex and cumbersome internal memory management and context switching schemes inside a single binary translation system process memory image. Primary space memory accesses (403) from active subordinate binary translation processes (402) are routed to it allowing local data access while the secondary space memory accesses (404) are routed to the corresponding foreign processes (412).

While the description of the present invention was influenced by the preferred embodiments discussed in detail, it is expected that some modifications or enhancements to the present invention could be made by those skilled in the art without deviating from the essence of the present invention. Therefore, the invention should be measured in terms of the claims that follow.

What is claimed is:

1. A host microprocessor capable of executing a native instruction set and a plurality of foreign instruction sets, the microprocessor comprising:
   a memory system including:
   a plurality of virtual memory spaces, each based on a distinct virtual address translation scheme and defined by a distinct page table structure;
      wherein only one of the available virtual memory spaces (native virtual memory space) contains native instructions, executable directly by the microprocessor, and associated data;
      wherein all other virtual memory spaces (foreign virtual memory spaces) contain foreign instructions, which cannot be executed directly by the host microprocessor, and associated data; and
      wherein each foreign virtual memory space is defined so as to mimic a virtual memory space of a foreign microprocessor, and wherein the means for simulating execution of instructions from multiple foreign instruction sets includes means for simulating execution of instructions for each foreign microprocessor being mimicked;
   a single physical memory space;
   a plurality of hardware mechanisms, each associated with one of the virtual memory spaces, for translating a virtual address in the associated virtual memory space into a physical address for the physical memory space in accordance with the virtual address translation scheme for the associated virtual memory space;

a plurality of memory access operations sets, wherein the number of the memory access operations sets equals the number of the virtual spaces; and means for simulating execution of instructions from multiple foreign instruction sets.

2. The host microprocessor of claim , wherein the means for simulating execution of instructions from multiple foreign instruction sets comprises a binary translation process.

3. The host microprocessor of claim 1, wherein the means for simulating execution of instructions from multiple foreign instruction sets comprises a binary translation process code, and wherein the binary translation process code and binary translated codes are located in the native virtual memory space only.

* * * * *

UNITED STATES PATENT AND TRADEMARK OFFICE
CERTIFICATE OF CORRECTION

| | | |
|---|---|---|
| PATENT NO. | : 7,069,412 B2 | Page 1 of 1 |
| APPLICATION NO. | : 10/453448 | |
| DATED | : June 27, 2006 | |
| INVENTOR(S) | : Boris A. Babaian et al. | |

It is certified that error appears in the above-identified patent and that said Letters Patent is hereby corrected as shown below:

Column 13, line 6, after "claim" insert -- 1 --.

Signed and Sealed this

Third Day of October, 2006

JON W. DUDAS
*Director of the United States Patent and Trademark Office*